United States Patent [19]

Dieckmann

[11] 4,158,640

[45] * Jun. 19, 1979

[54] STABLE LIQUID ANTIMONY ORGANIC SULFUR-CONTAINING COMPOUNDS

[75] Inventor: Dale J. Dieckmann, Euclid, Ohio

[73] Assignee: Dart Industries Inc., Los Angeles, Calif.

[*] Notice: The portion of the term of this patent subsequent to Jun. 14, 1994, has been disclaimed.

[21] Appl. No.: 805,372

[22] Filed: Jun. 10, 1977

Related U.S. Application Data

[63] Continuation-in-part of Ser. No. 592,038, Jun. 30, 1975, Pat. No. 4,029,618.

[51] Int. Cl.² .............................................. C09K 15/32
[52] U.S. Cl. ................................ 252/400 R; 252/404; 252/406; 260/23 XA; 260/45.75 B; 260/45.95 R
[58] Field of Search .................. 252/400 R, 406, 402, 252/404; 260/23 XA, 45.75 B

[56] References Cited

U.S. PATENT DOCUMENTS

| | | | |
|---|---|---|---|
| 3,887,508 | 6/1975 | Dieckmann | 252/406 X |
| 4,021,468 | 5/1977 | Lind | 252/406 |
| 4,029,618 | 6/1977 | Dieckmann | 260/45.75 B |

*Primary Examiner*—Benjamin R. Padgett
*Assistant Examiner*—J. L. Barr
*Attorney, Agent, or Firm*—Bryant W. Brennan; Margareta LeMaire

[57] ABSTRACT

Liquid antimony organic sulfur-containing compounds are rendered stable at ambient conditions by incorporating an effective amount of a phenol. Liquid antimony organic sulfur-containing compounds such as antimony mercaptoacid esters, and the like, are also rendered shelf stable by phenols such as catechol, t-butyl catechol and butylated hydroxy anisole. The stable liquid compositions contribute to the heat stability of vinyl halide resins.

11 Claims, No Drawings

STABLE LIQUID ANTIMONY ORGANIC SULFUR-CONTAINING COMPOUNDS

RELATED APPLICATION

This application is a continuation-in-part of my copending application Ser. No. 592,038, filed June 30, 1975, which issued as U.S. Pat. No. 4,029,618 on June 14, 1977.

BACKGROUND OF THE INVENTION

Antimony mercaptides have been proposed as stabilizers for vinyl halide resins to guard against degradation by heat during molding and working of the resin into useful articles. Prior art patents which disclose such antimony organic sulfur-containing compounds and their utility as stabilizers include U.S. Pat. Nos. 2,680,726; 2,684,956; 3,340,285; 3,399,220; 3,466,261 and 3,530,158. In past commercial practice, however, the antimony mercaptides have not been widely used as stabilizers because of various shortcomings including, for example, their propensity to exude from molded or worked PVC plastic stock, cost or lack of other advantages associated with their use which might outweigh such shortcomings. My U.S. Pat. No. 3,887,508 is directed to improvements in the utilization of antimony organic sulfur-containing compounds in combination with metal carboxylates. As described in my U.S. Pat. No. 3,887,508, the utility and efficiency of such antimony compounds are improved in the heat stabilization of vinyl halide resins to an unexpected degree. It has been observed, however, that such antimony compounds which are normally liquid tend to deteriorate or become unstable upon storage.

SUMMARY OF THE INVENTION

My above mentioned earlier application Ser. No. 592,038 was directed to further improvements in vinyl halide resin stabilizer systems of antimony organic sulfur-containing compounds. The invention described therein in one of its aspects provided for synergistic heat stabilizer compositions of antimony compounds as stabilizers and ortho-dihydric phenols. In another of its significant features, antimony organic sulfur-containing compounds are provided which are liquid and shelf-stable at ambient temperatures. Such stable liquid compositions are easily formulated into vinyl halide resin systems and offer synergistically heat stabilized resin systems with enhanced resistance to both early discoloration and long term heat degradation of molded plastics. It was found that antimony organic sulfur-containing compounds were rendered shelf-stable with certain dihydric phenols.

This application further amplifies liquid antimony compositions which are rendered stable for storage or use at ambient conditions by the addition thereto of a phenolic compound. For example, liquid antimony organic sulfur-containing compounds, including antimony mercaptoacid esters, tend to deteriorate upon standing. Such deterioration is observed by the formation and/or precipitation of solids in the liquid compounds. The precise reason for this deterioration phenomenon is unknown. Nevertheless, the resulting heterogeneous liquids not only increase the problems of measuring and mixing the antimony compounds into vinyl halide resins for stabilization, but practically speaking, heterogeneity causes a dissolute appearance which reduces the marketability of the antimony stabilizers. Thus, according to this invention, liquid antimony compounds are rendered shelf-stable at ambient temperatures by the incorporation of a phenolic component such as an ortho-dihydric phenol.

There are certain generally preferred weight ratios of the antimony organic sulfur-containing compounds relative to a particular phenol in order to achieve stability. This will become apparent in view of the detailed operating examples. However, it is to be emphasized that the most desirable weight ratios of each of the essential components of the composition of this invention for a particular application can be arrived at in accordance with the teachings of this invention. Thus, in its broader aspects, this invention is not limited to weight ratios of components. It has also been found that levels of a particular phenol in a particular antimony organic sulfur-containing compound to achieve optimum stabilities under certain conditions will vary as exemplified herein. But, most preferably and in general, a phenol is combined with the antimony organic sulfur-containing compound in an amount of about 0.1 to about 20 percent by weight of the antimony compound.

ANTIMONY ORGANIC SULFUR-CONTAINING COMPOUND

The antimony organic sulfur-containing compounds which are shelf-stabilized according to this invention are generally characterized as having the Sb - S group or linkage. Such antimony compounds may be liquids at normal or room temperatures and atmospheric conditions. On the other hand, such antimony compounds may be solids at normal temperatures and many soften or melt at elevated temperatures. Therefore, liquid stability at ambient conditions can be achieved where the antimony compound is either in the normal liquid, hot melt, or solvent-containing state at room or ambient temperatures and pressures where such compounds tend to undergo degradation due to the ambient conditions. In a most preferred form, the stabilization is achieved in liquid compositions which are shelf-stable at room or ambient temperatures. Such liquid compositions can be readily measured and mixed with other compositions, and are thus easy to formulate, market and use.

Generally, most antimony organic compounds suitable for use in this invention are derived from trivalent antimony and include mercaptides which may be characterized by the following formula:

Formula I $$Sb(SR)_3$$

wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., dodecyl or dedecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula Sb(SR)$_3$ or a similar formula and a definition of compounds represented thereby include U.S. Pat. Nos. 2,684,956 and 3,466,261, among others.

Antimony organic sulfur-containing compounds other than the antimony mercaptides of the Formula I above, are suitable for use according to this invention. Such compounds are generally termed antimony mercaptoacid esters which may be further defined by the following formula:

Formula II $$Sb(SRCOOR')_3$$

wherein R is selected from the group consisting of alkylene, arylene, and aralkylene radicals and R' is a substituted or unsubstituted alkyl, aryl or mixed aryl-alkyl group. Thus R may be derived from mercapto acetic, β-mercaptopropionic, thiomalic, thiosalicyclic acids, etc. Similarly, R' may be derived from decanols, glycerol, glycol, monoesters, dihydroabietyl alcohol, phenoxyethanol, pentaerythritol, etc. Particularly suitable are the esters of mercapto alcohols, such as thioglycols, in which the hydroxy groups are esterified by an aliphatic, aromatic or alicyclic saturated or unsaturated monocarboxylic acid. Readily available mercaptoacid esters are the esters of thioglycolic acid, such as ethyl thioglycolate, isooctylithioglycolate, and generally the esters of mono and dibasic aliphatic and aromatic mercapo acids, such as esters of beta thiopropionic acid, thiolactic acid, thiobutyric acid and mercapto lauric acid. Specific examples of antimony mercaptoacid esters include antimony tris (isooctylthioglycolate), antimony tris (glycoldimercaptoacetate), antimony tris (dodecylthioglycolate), dodecylmercaptoantimony bis (isooctylthioglycolate), and antimony tris (isooctyl-β-mercaptopropionate). Patents exemplifying Formula II or a similar formula and a definition of compounds represented thereby include U.S. Pat. Nos. 2,680,726 and 3,530,158, among others.

The antimony organic sulfur-containing compounds having the SbS group represented by Formulas I and II come within the scope of a broader characterization illustrated by the following formula:

Formula III $$R_nSbX_{3-n}$$

wherein R is selected from the group consisting of alkyl, alkenyl, alkynyl, aryl, cycloalkyl, cycloalkenyl, and mixed aryl-alkyl, and substituted groups thereof, where X is selected from the group consisting of sulfide (sulfur) or mercaptide and n is an integer of 0 to 2. Of course, other X groups are SR and SRCOOR' defined by Formulas I and II above wherein R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof. This is also apparent, and with reference to the above incorporated U.S. Pat. No. 3,530,158, that when X is divalent, e.g. sulfide, the compound may be RSbX as exemplified hereinafter by n-butyl antimony sulfide when n of $R_n$ in Formula III is 1 and where n of $X_{3-n}$ is 2. It is therefore appreciated that the formulas herein are merely representative indicia of the class of antimony compounds which respond to the teachings of this invention. In the compounds, $R_nSbX_{3-n}$ which may be used in practice of this invention, R may be alkyl, cyloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e. allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phelethynyl, ethynyl, etc. Typical aryl groups which may be employed may include phenyl, tolyl, xylyl, chlorophenyl, dimethylaminophenyl, etc. Where more than one R or X is present in Formula III, such groups may be the same or different. Typical mercaptides include phenyl mercaptide, lauryl mercaptide, butyl mercaptide, or dimercaptides including aliphatic, cycloaliphatic, or aromatic dimercaptans of the R groups disclosed herein, etc. Specific compounds when n is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allkylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,520,158 and 3,399,220. Where the R group is aryloxy, alkyloxy, alkaryloxy, acyloxy, etc., specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid esters, etc., per se form no part of this invention and the mentioned patents and their specific disclosures clearly teach these compounds and their method of production to enable anyone of ordinary skill to use them in carrying out this invention.

PHENOLS

The terms "phenol" and "phenols" as used herein are intended to include mono- or polynuclear phenols exemplified by the benzene or naphthalene nucleus, and, the substituted forms of such a nucleus. As reported in my earlier mentioned copending application, the ortho-dihydric phenols of such mono or poly-nuclear phenols have been found by me to provide liquid, shelf-stable compositions of antimony compounds at ambient temperatures. Specific examples of such phenols include ortho-dihydric phenols, i.e., catechol, tertiary butyl catechol, and 2,3 dihydroxynaphthalene. These specific phenols may be represented by the following formula:

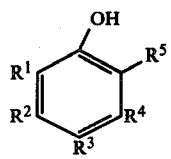

wherein $R^1$, $R^2$, $R^3$, $R^4$ or $R^5$ is either hydrogen, alkyl, aryl hydroxyl, alkoxy, aryloxy, alkaryl, aralkyl, other substituted groups of said aryl or alkyl, arylaceto, alkylaceto, arylester, alkylester, and the like, or may be a carbon residue which forms a part of an aromatic or alkylated aromatic nucleus as in the case when the phenolic nucleus is naphthalene. Alkyl substituted groups of mono or polynuclear phenols of this formula include straight or branched chain groups of $C_{1-12}$, such as methyl, ethyl, propyl, pentyl, hexyl, heptyl, dodecyl, or tertiary butyl, isopropyl, etc., forms. The presently preferred phenols of this invention are the catechol derivatives because of their performance and commercial availability. Other monohydric or trihydric phenols, or other functionally substituted mono-, di- or polyhydric phenols can be employed. Included in such phenols are mono-, di-, tri- isobutyl or isooctyl phenol; 2,4,5-trihydroxybutyrophenone; butylated hydroxyanisole which is a mixture of ortho- and meta-butyl parahydroxyanisole; tecquinol; resorcinol; 2,6-di-ti-butyl-p-cresol; resorcinol monobenzoate and p-octylphenyl salicylate. It will be appreciated that specific phenols may be used to achieve stabilization results along with other advantages as empirically demonstrated in numerous operating examples of this invention, and a further understanding thereof will become apparent in view of the detailed description herein.

The principles of this invention and its operating parameters will be further understood with reference to the following detailed examples which serve to illustrate the types of specific materials and their amounts as used in the stabilization of antimony compounds according to this invention. These examples are considered to be exemplary of this invention, and should not be considered as limiting, especially in view of applicant's broad disclosure of principles of this invention.

In the examples of Tables I and II which follow, various combinations of an antimony organic sulfur-containing compound and a phenol were blended together to form a liquid composition on a parts by weight basis. All amounts of components are on a percent by weight basis, or as indicated, simply "%." The phenols were incorporated in a liquid antimony tris-isooctylthioglycolate (ATG) on the basis of about 0.1 to about 20 percent by weight of the antimony compound as indicated in the Tables. The stabilities of the resulting blends of ATG and t-butyl catechol (TBC) or ATG and butylated hydroxyanisole (BHA) were determined at normal room temperature and pressure (20°-25° C. and atmospheric), as reported in Tables I and II, respectively, in open bottles.

TABLE I

| % TBC | TIME | | | | |
|---|---|---|---|---|---|
| | 1 day | 1 wk. | 2 wks. | 3 wks. | 4 wks. |
| 0 | Clear | Clear | Hazy | Hazy | Hazy |
| 0.1 | Clear | Clear | Clear | Clear | Clear |
| 0.5 | Clear | Clear | Clear | Clear | Clear |
| 1.0 | Clear | Clear | Clear | Clear | Clear |
| 10.0 | Clear | Clear | Clear | Clear | Clear |
| 20.0 | Clear | Clear | Clear | Clear | Clear |

TABLE II

| % BHA | TIME | | | | | | | | |
|---|---|---|---|---|---|---|---|---|---|
| | 1 day | 3 days | 1 wk. | 2 wks. | 3 wks. | 4 wks. | 5 wks. | 6 wks. | 7 wks. | 8 wks. |
| 0 | clear | sl. hazy | sl. hazy | hazy | hazy | hazy | opaque | opaque | opaque | opaque |
| 5.0 | clear | v. sl. hazy | v. sl. hazy | sl. hazy | sl. hazy | sl. hazy | sl. hazy | sl. hazy | sl. hazy | clear |
| 3.0 | clear | clear | clear | clear | v. sl. hazy | v. sl. hazy | v. sl. hazy | v. sl. hazy | v. sl. hazy | clear |
| 2.0 | clear | clear | clear | clear | clear | clear | clear | clear | clear | clear |
| 1.0 | clear | clear | clear | clear | clear | clear | clear | clear | clear | v. sl. hazy |
| 0.5 | clear | clear | clear | clear | clear | clear | clear | clear | clear | v. sl. hazy |
| 0.3 | clear | clear | clear | clear | clear | clear | clear | clear | clear | v. sl. hazy |
| 0.1 | clear | clear | clear | clear | clear | clear | clear | clear | sl. hazy | v. sl. hazy |

In the Tables "wk." or "wks." means week(s); "clear" means homogeneous transparent liquid; "v. sl. hazy" means very minor amount of insolvent particle appearance; "sl. hazy" and "hazy" respectively means increasing insolvent appearance; and "opaque" means loss of transparency. Thus, as can be seen by both Tables, at room temperature and normal atmosphere, the unmodified liquid antimony compound develops haze and becomes opaque on standing for several weeks. In the presence of minor amounts of t-butyl catechol, no deterioration is noted (see Table I). The stabilizing response of TBC would appear to be linear with increasing amounts. However, Table II demonstrates that the stabilizing response of butylated hydroxy anisole (BHA) is not completely linear. Rather, while improvements are observed with varying amounts of 0.1 to 5.0%, complete clarity is retained throughout an eight week period with about 2% of BHA.

Accelerated shelf stability tests have also been conducted. In these tests an apparatus was assembled to supply air to liquid antimony samples containing varying amounts of phenols. An air supply was connected to a flowmeter and through a hose to a 1000 ml vacuum flask containing 750 mls water. After bubbling through the water, the air was conducted through a glass tube to a 400 ml breaker containing 150 grams of antimony tris-isooctylthioglycolate heated to 260° F., for bubbling through the liquid. Procedurally, the antimony liquid was charged into the beaker and desired percents of phenols were added to liquid samples. Then, the liquid was stirred under a temperature held at 260° F. with 4 SCFH of air supplied. With the passage of time in minutes, the moment of opacity was recorded as the time at which the centrally located glass tube in the beaker evolving air could no longer be seen when viewed through the side of the beaker.

Employing the accelerated tests described above, opacity occurred for varying percents of TBC as shown in Table III. The control (0%) opacified in 22 minutes.

TABLE III

| % TBC | Opacity (min.) |
|---|---|
| 0 | 22 |
| 0.5 | 44 |
| 1.25 | 61 |
| 2.0 | 68 |
| 2.5 | 81 |
| 3.5 | 112 |
| 5.0 | 138 |

Thus, TBC achieves a linear stabilization of the liquid antimony over a period of time with increasing amounts. This accelerated data of Table III confirms ambient test results on TBC in the sense that increased stability is achieved with increasing amounts of phenol.

Accelerated tests were also performed for BHA under the same conditions described above and the results are reported in Table IV.

TABLE IV

| % BHA | Opacity (min.) |
|---|---|
| 0 | 22 |
| 0.5 | 31 |
| 1.25 | 28 |
| 2.0 | 38 |
| 2.5 | 43 |
| 3.0 | 36 |
| 3.5 | 23 |
| 4.25 | 25 |
| 5.0 | 26 |

Accelerated data of Table IV thus parallels the data of Table II above and indicates its reliability in similarly predicting long term shelf storage stability for the liquid antimony compositions.

Employing accelerated tests, at 2.5% phenol component in ATG, improvements of at least about 20 minutes in stability have been observed for butylated hydroxy anisole; p-dihydroxy-benzene; m-dihydroxybenzene; 2,6-di-tert-butyl-para-cresol; resorcinol monobenzoate; p-octylphenyl salicylate; a mixture of di- and tri- alkyl phenols were the alkyl group substituted in the 2, 3 and 5 positions is isobutyl or isooctyl; o-dihydroxy-benzene; and 2, 4, 5-trihydroxybutyrophenone. In the case of other phenols such as butylated hydroxy anisole; 2,2'-bis (4-hydroxyphenyl) propane; 4, 4'-butylidenebis (6-tert-butyl-m-cresol); 4, 4'-thiobis-(6-tert-butyl-m-cresol); and dihydroxy-naphthalene, improvements are observed at levels between 0.5–5.0%, but optimums vary depending upon the phenol and amount with the particular antimony compound.

In addition to the above examples, as reported in my earlier application examples, which are incorporated herein by reference, the combination of several o-dihydric phenols and liquid antimony tris (isooctyl-β-mercaptopropionate), hereinafter "ATP," were demonstrated. Each of the combinations containing 5% phenol were shelf-stable liquids at ambient temperature.

The o-dihydric phenols were 4-tertiary butyl catechol, catechol and 2,3-dihydroxynaphthalene.

As developed above, the antimony compound may be liquid in its normal state, i.e., at room temperature and atomspheric pressure. Also, the antimony compound may be rendered liquid by the addition of a solvent. In this connection, antimony tris (lauryl mercaptide) is a pasty solid at ambient temperatures. A composition of 50% hydrocarbon solvent and 50% antimony tris (lauryl mercaptide) was formulated and at room temperature and ambient pressure was a clear liquid. When a sample of such a composition was tested for stability under the accelerated procedure described above, a control without phenolic stabilizer became opaque after about 35 minutes. Upon the addition of 5% tertiary butyl catechol, and the performance of the accelerated tests under the same conditions as the control, the phenolic containing composition did not become opaque until a passage of 70 minutes. Accordingly, liquid antimony stabilizer compositions in a normal state or solvated state can be stabilized in accordance with the principles of this invention.

It is also to be understood that other components can be used and the benefits of this invention can be achieved. Accordingly, other modifications will become apparent in view of the teachings herein without departing from the true spirit and scope of this invention.

What is claimed is:
1. A liquid antimony composition, stable under ambient conditions, which consists essentially of:
a liquid comprising an antimony organic sulfur-containing compound having the formula

$$R_nSbX_{3-n}$$

where R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof and where n is an integer of 0 to 2, and as a stabilizer therefor an effective stabilizing amount representing only a minor proportion of said compound of a dihydric, trihydric or substituted mono-, di- or tri-hydric phenol.

2. The composition of claim 1 wherein said phenol is selected from the group consisting of mono-isobutyl phenol, di-isobutyl phenol, tri-isobutyl phenol, mono-isooctyl phenol, di-isooctyl phenol, tri-isooctyl phenol, 2,4,5-trihydroxybutyro-phenone, butylated hydroxyanisole, para-dihydroxybenzene, resorcinol, 2,6-di-tertiary-butyl-p-cresol, resorcinol mono-benzoate, para-octylphenyl salicylate, catechol, tertiary butyl catechol, 2,3-di-hydroxynaphthalene, a mixture of di- and tri- alkyl phenols where the alkyl group in each of the 2, 3 and 5 positions is isobutyl or isooctyl, 2,2'-bis (4-hydroxyphenyl) propane, 4,4' butylidenebis (6-tert-butyl-m-cresol) and 4,4'-thiobis- (6-tert-butyl-m-cresol).

3. The composition of claim 1 which is liquid and shelf-stable at room temperatures for at least several weeks.

4. The composition of claim 1 wherein said antimony compound is selected from the group consisting of antimony tris (isooctylthioglycolate), antimony tris (isooctylmercaptopropionate), dodecylmercaptoantimony bis (isooctylthioglycolate), antimony tris (glycoldimeercaptoacetate), and mixtures thereof.

5. The composition of claim 2 wherein said phenol is butylated hydroxyanisole.

6. The composition of claim 2 containing said phenol in an amount of about 0.1 to about 20% by weight of said compound.

7. A liquid antimony composition which is shelf-stable at room conditions for at least several weeks consisting essentially of a normally liquid antimony organic sulfur-containing compound having the formula

where R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof and where n is an integer of 0 to 2, and as a stabilizer therefor an effective stabilizing amount representing only a minor proportion of said compound of a dihydric, trihydric or substituted mono-, di- or tri- hydric phenol.

8. The composition of claim 7 wherein said phenol is selected from the group consisting of mono-isobutyl phenol, di-isobutyl phenol, tri-isobutyl phenol, mono-isooctyl phenol, di-isooctyl phenol, tri-isooctyl phenol, 2,4,5-trihyroxybutyro-phenone, butylated hydroxyanisole, para-dihydroxybenzene, resorcinol, 2,6-di-tertiary-butyl-p-cresol, resorcinol mono-benzoate, para-octylphenyl salicylate, catechol, tertiary butyl catechol, 2,3-di-hydroxynaphthalene, a mixture of di- and trialkyl phenols where the alkyl group in each of the 2, 3 and 5 positions is isooctyl, 2,2'-bis (4-hydroxyphenyl) propane, 4,4' butylidenebis (6-tert-butyl-m-cresol) and 4,4'-thiobis- (6-tert-butyl-m-cresol).

9. The composition of claim 7 wherein said antimony compound is selected from the group consisting of antimony tris (isooctylthioglycolate), antimony tris (isooctylmercaptopro-pionate), dodecylmercaptoantimony bis (isooctylthioglycolate), antimony tris (glycoldimeercaptoacetate), and mixtures thereof.

10. The composition of claim 8 wherein said phenol is butylated hydroxyanisole.

11. The composition of claim 8 wherin the relative amount of phenol present in from about 1 to about 20 percent by weight of said antimony compound.

* * * * *

UNITED STATES PATENT AND TRADEMARK OFFICE
CERTIFICATE OF CORRECTION

PATENT NO. : 4,158,640  Page 1 of 2
DATED : June 19, 1979
INVENTOR(S) : Dale J. Dieckmann It is certified that error appears in the above-identified patent and that said Letters Patent are hereby corrected as shown below:

Column 2, line 64 - "dodecyl or dedecyl" should read --decyl or dodecyl--.

Column 3, line 33 - "isooctylithioglycolate" should read --isooctylthioglycolate--.

Column 4, line 24 - "phelethynyl" should read --phenlethynyl--.

Column 4, line 44 - "Pat. Nos. 3,520,158" should read --Pat. Nos. 3,530,158--.

Column 5, line 12 - "aryl hydroxyl" should read --aryl,hydroxyl--.

Column 5, line 46 - "osole" should read --sole--.

Column 5, line 47 - "2,6-di-ti" should read --2,6-di-t- --.

Column 6, line 64 - "breaker" should read --beaker--.

Column 7, line 52 - "were" should read --where--.

UNITED STATES PATENT AND TRADEMARK OFFICE
CERTIFICATE OF CORRECTION

PATENT NO. : 4,158,640

DATED : June 19, 1979

INVENTOR(S) : Dale J. Dieckmann

It is certified that error appears in the above-identified patent and that said Letters Patent are hereby corrected as shown below:

Column 9, line 8 - "glycoldimeer-) should read --(glycoldimer- --.

Column 10, line 12 - "2,4,5-trihyroxybutyro-" should read --2,4,5-trihydroxybutyro- --.

Column 10, line 24 - "tylmercaptopro-pionate)", should read -- tylmercaptopropionate)--.

Signed and Sealed this

Eighth Day of January 1980

[SEAL]

Attest:

SIDNEY A. DIAMOND

Attesting Officer

Commissioner of Patents and Trademarks